(12) United States Patent
Yamamoto et al.

(10) Patent No.: US 10,866,345 B2
(45) Date of Patent: Dec. 15, 2020

(54) LAMINATED LENS STRUCTURE, CAMERA MODULE, AND METHOD FOR MANUFACTURING LAMINATED LENS STRUCTURE

(71) Applicant: SONY SEMICONDUCTOR SOLUTIONS CORPORATION, Kanagawa (JP)

(72) Inventors: Atsushi Yamamoto, Kanagawa (JP); Hiroyasu Matsugai, Kanagawa (JP); Kensaku Maeda, Kanagawa (JP); Tomoharu Ogita, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/323,917

(22) PCT Filed: Jun. 27, 2017

(86) PCT No.: PCT/JP2017/023612
§ 371 (c)(1),
(2) Date: Feb. 7, 2019

(87) PCT Pub. No.: WO2018/034063
PCT Pub. Date: Feb. 22, 2018

(65) Prior Publication Data
US 2019/0162880 A1    May 30, 2019

(30) Foreign Application Priority Data
Aug. 15, 2016   (JP) .................................. 2016-159249

(51) Int. Cl.
*G02B 3/00*      (2006.01)
*G02B 7/02*      (2006.01)
(Continued)

(52) U.S. Cl.
CPC ........ *G02B 3/0012* (2013.01); *B29D 11/0048* (2013.01); *B29D 11/0073* (2013.01);
(Continued)

(58) Field of Classification Search
CPC .......... G02B 3/0012; G02B 7/02; G02B 3/00; G02B 13/001; G02B 3/0075;
(Continued)

(56) References Cited

U.S. PATENT DOCUMENTS 8,547,470 B2 * 10/2013 Yano ................ B29D 11/00432
                                                          348/335
2008/0100934 A1 * 5/2008 Webster ................ G02B 7/021
                                                          359/830
(Continued)

FOREIGN PATENT DOCUMENTS

JP    2007-163889    6/2007
JP    2009-003130    1/2009
(Continued)

OTHER PUBLICATIONS

International Search Report prepared by the Japan Patent Office dated Jul. 27, 2017, for International Application No. PCT/JP2017/023612.

*Primary Examiner* — Nhan T Tran
(74) *Attorney, Agent, or Firm* — Sheridan Ross P.C.

(57) ABSTRACT

To prevent the resin from oozing out during the lens molding due to the capillary action. A laminated lens structure according to the present disclosure includes: a plurality of lens structures including a substrate provided with an opening part, a lens inserted into the opening part to be fixed to the substrate, and a recessed part provided at an area in which a lateral face of the opening part and a surface of the substrate are intersected, and recessed more than the surface of the substrate. The lenses are arrayed in an optical axis
(Continued)

direction by the substrates being joined. This configuration makes it possible to prevent the resin from oozing out during the lens molding due to the capillary action.

20 Claims, 13 Drawing Sheets

(51) Int. Cl.
  *B29D 11/00* (2006.01)
  *G02B 13/00* (2006.01)
  *H04N 5/225* (2006.01)

(52) U.S. Cl.
  CPC .......... *B29D 11/00307* (2013.01); *G02B 3/00* (2013.01); *G02B 3/0075* (2013.01); *G02B 7/02* (2013.01); *G02B 13/001* (2013.01); *H04N 5/2254* (2013.01)

(58) Field of Classification Search
  CPC .. G02B 13/0085; G02B 7/022; G02B 3/0062; H04N 5/2254; B29D 11/0073; B29D 11/0048; B29D 11/00307; B29D 11/00365; B29D 11/00403
  See application file for complete search history.

(56) References Cited

U.S. PATENT DOCUMENTS

| | | | |
|---|---|---|---|
| 2011/0037887 A1* | 2/2011 | Lee | G02B 13/0035 348/340 |
| 2012/0200946 A1* | 8/2012 | Wippermann | G02B 7/028 359/811 |
| 2013/0003199 A1* | 1/2013 | Jeong | G02B 13/003 359/819 |
| 2016/0356995 A1* | 12/2016 | Mouws | B29D 11/00307 |
| 2018/0246258 A1* | 8/2018 | Shiraiwa | B29D 11/00307 |
| 2018/0259749 A1* | 9/2018 | Moriya | B29D 11/00307 |

FOREIGN PATENT DOCUMENTS

| | | | |
|---|---|---|---|
| JP | 2009-018578 | | 1/2009 |
| JP | 2011-508253 | | 3/2011 |
| JP | 2012-533775 | | 12/2012 |
| JP | 2013122480 A | * | 6/2013 |
| JP | 2015-011072 | | 1/2015 |

* cited by examiner

LAMINATED LENS STRUCTURE, CAMERA MODULE, AND METHOD FOR MANUFACTURING LAMINATED LENS STRUCTURE

CROSS REFERENCE TO RELATED APPLICATIONS

This application is a national stage application under 35 U.S.C. 371 and claims the benefit of PCT Application No. PCT/JP2017/023612 having an international filing date of 27 Jun. 2017, which designated the United States, which PCT application claimed the benefit of Japanese Patent Application No. 2016-159249 filed 15 Aug. 2016, the entire disclosures of each of which are incorporated herein by reference.

TECHNICAL FIELD

The present disclosure relates to a laminated lens structure, a camera module, and a method for manufacturing a laminated lens structure.

BACKGROUND ART

In the past, for example, the following Patent Literature 1 discloses a technique under the assumption that a shaped object such as a lens array is shaped such that while a light curing resin and a transfer body in which a transfer geometry part is formed are brought into contact with each other, the light curing resin is deformed in accordance with a transfer geometry of the transfer body.

CITATION LIST

Patent Literature

Patent Literature 1: JP 2009-18578A

DISCLOSURE OF INVENTION

Technical Problem

However, in a case where the lens array or the like is molded by the method described in the above Patent Literature 1, there is a problem that when the transfer body is brought into contact with the light curing resin, the light curing resin would be exuded due to a capillary action.

Accordingly, it is required to prevent the resin from oozing out during lens molding due to the capillary action.

Solution to Problem

According to the present disclosure, there is provided a laminated lens structure including: a plurality of lens structures including a substrate provided with an opening part, a lens inserted into the opening part to be fixed to the substrate, and a recessed part provided at an area in which a lateral face of the opening part and a surface of the substrate are intersected, and recessed more than the surface of the substrate. The lenses are arrayed in an optical axis direction by the substrates being joined.

In addition, according to the present disclosure, there is provided a camera module including: a laminated lens structure including a plurality of lens structures including a substrate provided with an opening part, a lens inserted into the opening part to be fixed to the substrate, and a recessed part provided at an area in which a lateral face of the opening part and a surface of the substrate are intersected, and recessed more than the surface of the substrate, in which the lenses are arrayed in an optical axis direction by the substrates being joined; and an imaging element having an imaging surface on which an object image is formed by the lens of the laminated lens structure.

In addition, according to the present disclosure, there is provided a method of manufacturing a laminated lens structure, including: a step of sealing an opening part by inserting a first mold from a side, not provided with a recessed part, into the opening part of a substrate having the opening part, in which the substrate is provided with the recessed part that is recessed more than a surface of the substrate at an area in which a lateral face of the opening part and the surface of the substrate are intersected; a step of filling a resin in the opening part; a step of pressing a second mold against the resin by inserting the second mold from a side provided with the recessed part into the opening part; and a step of hardening the resin.

Advantageous Effects of Invention

As described above, according to the present disclosure, it is possible to prevent the resin from oozing out during the lens molding due to the capillary action.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
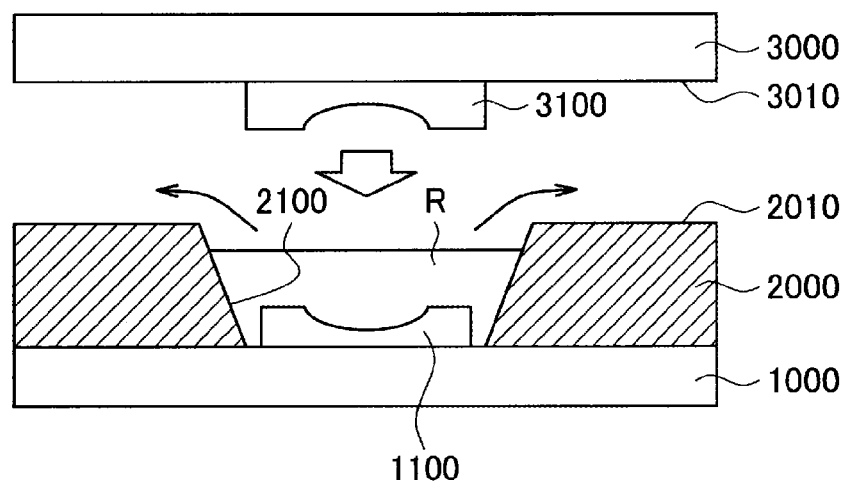
FIG. 1 is a schematic diagram showing a part of a manufacturing process of a lens module manufactured by a semiconductor process.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.

1. Technique to be Premised
2. Configuration Example of Lens Structure Pertaining to Present Disclosure
3. Variation in Shape of Recessed Part
4. Lamination of Substrate
5. Method for Manufacturing Substrate Having Recessed Part 1. Technique to be Premised First, a technique to be premised for an embodiment of the present disclosure will be described. FIG. 1 is a schematic diagram showing a part of a manufacturing process for a lens module manufactured by a semiconductor process. In FIG. 1, a substrate 2000 for constituting a lens module is made up of a material of, for example, silicon (Si) or the like, and an opening part 2100 is formed in the substrate 2000 by the semiconductor process. A lateral face of the opening part 2100 is formed as a tapered surface at an angle of about 55 degrees in accordance with a crystal orientation. An antireflection film for suppressing reflection is formed on the lateral face of the opening part 2100.

FIG. 1 shows the following process: after a lower replica substrate 1000 provided with a lower mold 1100 is adhered from the lower side to the substrate 2000 in which the opening part 2100 is formed, and a resin R is filled within the opening part 2100, an upper replica substrate 3000 provided with an upper mold 3100 is adhered from the upper side to the substrate 2000. The resin R within the opening part 2100 is molded by the upper replica substrate 3000 and the lower replica substrate 1000 to be served as a mold for an imprint. The resin R is, for example, a light (such as ultraviolet light) curing resin, and when ultraviolet light is irradiated to the resin R in a state filled between the lower mold 1100 and the upper mold 3100, a lens in accordance with geometries of the lower mold 1100 and the upper mold 3100 is molded within the opening part 2100. After the lens is molded, the lower mold 1100 and the upper mold 3100 are removed from the substrate 2000.

However, as a lower surface 3010 of the upper replica substrate 3000 comes closer to an upper surface 2010 of the substrate 2000 upon the formation of the lens by the method shown in FIG. 1, an interval between the lower surface 3010 and the upper surface 2010 becomes narrower, so that the resin R will be protruded to the upper surface 2010 of the substrate 2000 due to a capillary action. For this reason, when the ultraviolet light is irradiated to the resin, the resin protruded to the upper surface 2010 of the substrate 2000 will be hardened, so that unevenness will be produced on the upper surface 2010. When a plurality of the substrates 2000 is laminated to constitute a lens array, that upper surface 2010 is the surface that abuts on the adjacent substrate 2000. For this reason, when the substrates 2000 each of which the lens is formed are laminated to form the lens array, if the unevenness is formed on the upper surface 2010 due to the protruded resin R, a defect in joining is generated, and a problem will occur such that an error between intervals of the laminated lenses is generated.

2. Configuration Example of Lens Structure Pertaining to Present Disclosure

Figure 2:
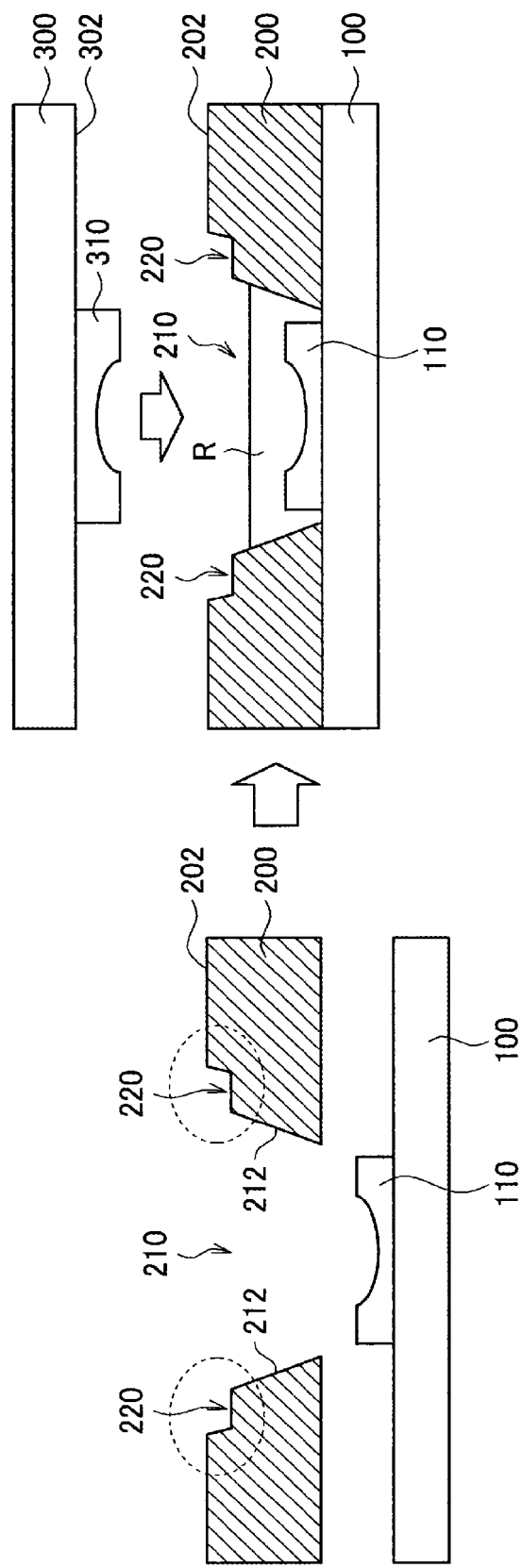
FIG. 2 is a schematic diagram showing a configuration of a lower replica substrate, a substrate and an upper replica substrate in accordance with an embodiment of the present disclosure.

FIG. 2 is a schematic diagram showing a configuration of a lower replica substrate 100, a substrate 200 and an upper replica substrate 300 in accordance with an embodiment of the present disclosure. Similarly to FIG. 1, an opening part 210 is formed in the substrate 200, and a lateral face 212 of the opening part 210 is formed as a tapered surface expanded upward. At a position in which an upper surface 202 of the substrate 200, and the lateral face 212 are intersected, a recessed part 220 recessed more than the upper surface 202 is provided.

As shown in FIG. 2, after a lower replica substrate 100 provided with a lower mold 110 is adhered from the lower side to the substrate 200 in which the opening part 210 is formed, and the resin R is filled within the opening part 210, an upper replica substrate 300 provided with an upper mold 310 is adhered from the upper side to the substrate 200. At this time, when a lower surface 302 of the upper replica substrate 300 comes closer to the upper surface 202 of the substrate 200, an interval between the lower surface 302 and the upper surface 202 becomes narrower; however, since the recessed part 220 is provided at the edge of the opening part 210, the recessed part 220 functions as a buffer layer of air, so that exudation of the resin R to the upper surface 202 due to the capillary action can be reduced. In this way, protrusion of the resin R onto the upper surface 202 can be suppressed.

Figure 3:
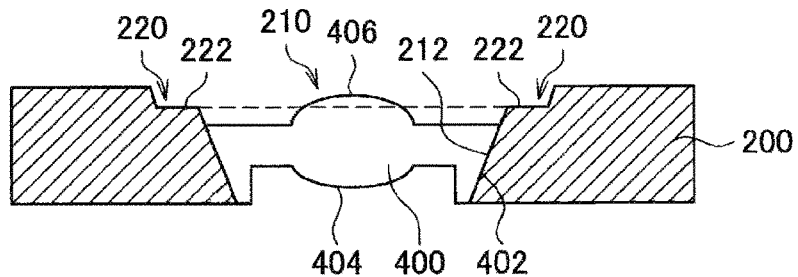
FIG. 3 is a schematic cross-sectional view showing a state in which the lower replica substrate and the upper replica substrate are removed after the resin R is hardened.
Figure 4:
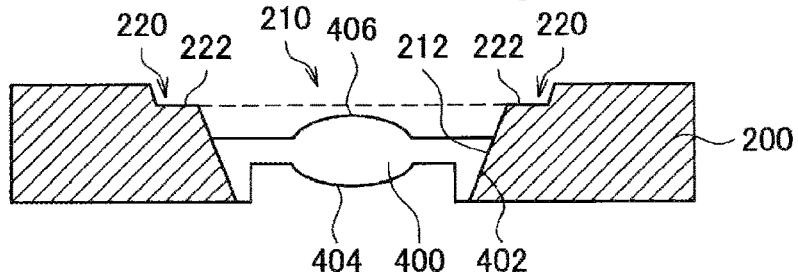
FIG. 4 is a schematic cross-sectional view showing a state in which the lower replica substrate and the upper replica substrate are removed after the resin R is hardened.

FIG. 3 and FIG. 4 each are a schematic cross-sectional view showing a state in which the lower replica substrate 100 and the upper replica substrate 300 are removed after the resin R is hardened. The lens 400 is molded such that the resin R is hardened. The lateral face 402 of the lens 400 is joined (fixed) to the lateral face 212 of the opening part 210 by the molding. The lens 400 has lens surfaces 404, 406 in accordance with geometries of the lower mold 110 and the upper mold 310, respectively. FIG. 3 shows a case where the upper surface 222 of the recessed part 220 is located at a position lower than the uppermost portion of the lens surface 406. FIG. 4 also shows a case where the upper surface 222 of the recessed part 220 is located at a position higher than the uppermost portion of the lens surface 406. As shown in FIG. 3, in a case where the lens 400 is located at a relatively higher position within the opening part 210, the resin R is easy to be exuded to the upper surface 222 when the upper replica substrate 300 is adhered from the upper side to the substrate 200; however, it is possible to suppress surely the exudation of the resin R to the upper surface 222 by the provision of the recessed part 220.

Figure 5:
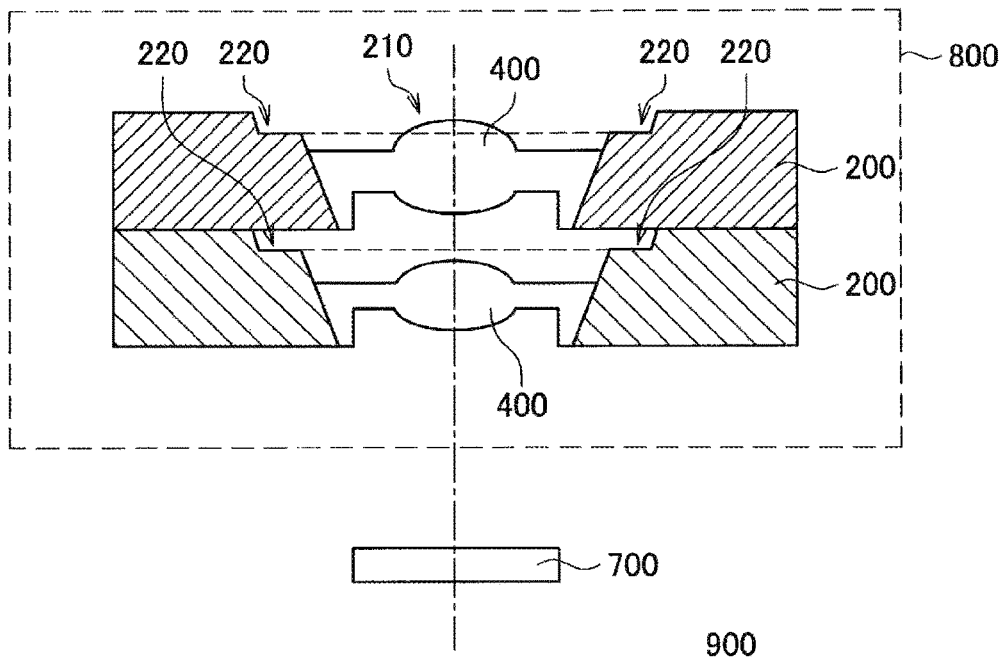
FIG. 5 is a schematic diagram showing a laminated lens structure in accordance with the present embodiment, and a camera module including the laminated lens structure.

FIG. 5 is a schematic diagram showing a laminated lens structure 800 in accordance with the present embodiment, and a camera module 900 including the laminated lens structure 800. The laminated lens structure 800 is configured by lamination of the substrate 200 having the lens 400 as shown in FIG. 3 and FIG. 4. In FIG. 5, the upper substrate 200 is joined to the lower substrate 200. In addition, the camera module 900 includes the laminated lens structure 800 and an imaging element 700. The laminated lens structure 800 forms an object image on an imaging surface of the imaging element 700, and the imaging element 700 outputs an image signal corresponding to a light quantity of the object image by photoelectric conversion.

3. Variation in Shape of Recessed Part

Figure 6A:
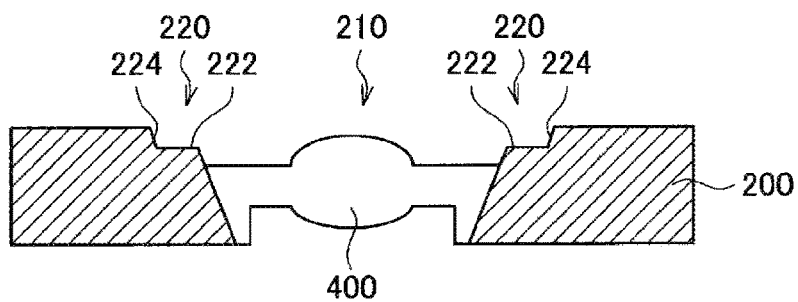
FIG. 6A is a schematic view showing a variation in shape of a recessed part.
Figure 6B:
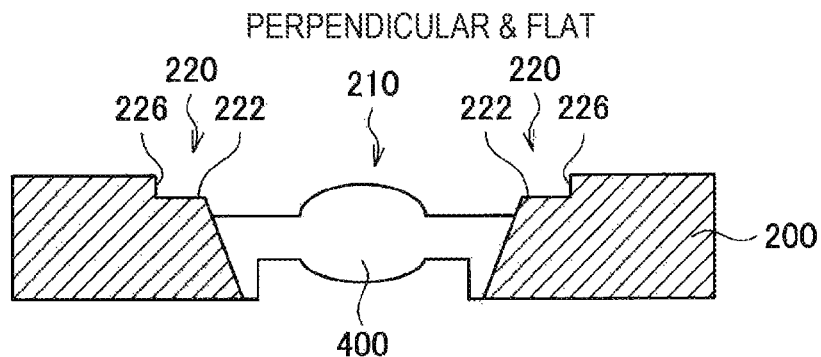
FIG. 6B is a schematic view showing a variation in shape of a recessed part.
Figure 6C:
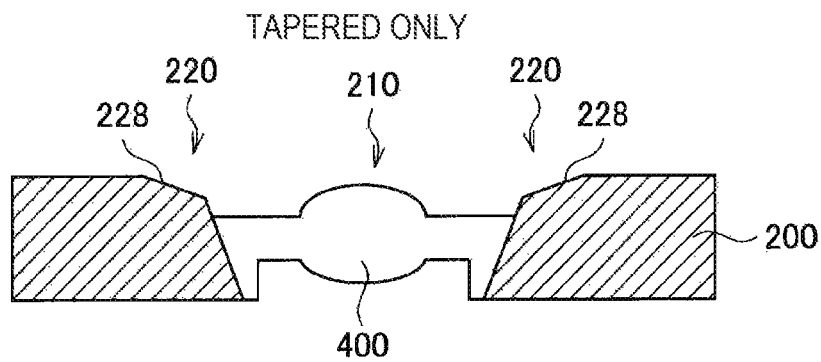
FIG. 6C is a schematic view showing a variation in shape of a recessed part.
Figure 6D:
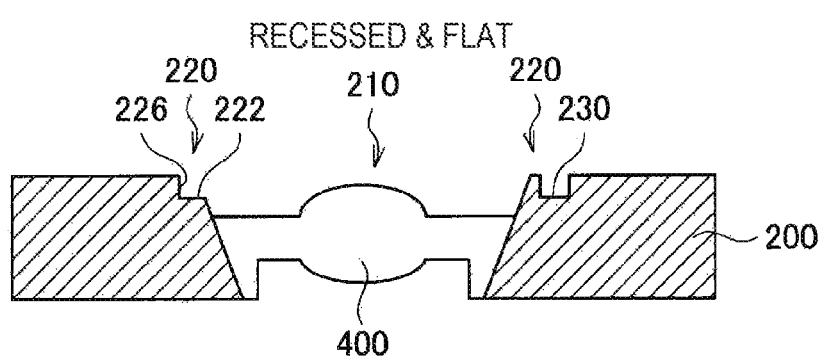
FIG. 6D is a schematic view showing a variation in shape of a recessed part.

FIG. 6A to FIG. 6H each are a schematic view showing a variation in shape of the recessed part 220. The shape of the recessed part 220 is not particularly limited so long as the recessed part 220 functions as the buffer layer of air for suppressing the exudation of the resin R to the upper surface 202. FIG. 6A shows an example in which the recessed part 220 includes a flat upper surface 220 and a tapered lateral face 224. The angle of the lateral face 224 can be set to about 55 degrees that is the same as the lateral face of the opening part 210. FIG. 6B shows an example in which the recessed part 220 includes the flat upper surface 220 and a perpendicular lateral face 226. The perpendicular lateral face 226 can be formed such that dry etching is particularly employed in the manufacturing process. FIG. 6C shows an example in which the recessed part 220 includes only a tapered surface 228. On the right side of FIG. 6D, there is shown an example in which the recessed part 220 includes a groove 230, while the recessed part 220 on the left side of FIG. 6D is similar to that of FIG. 6B.

Figure 6E:
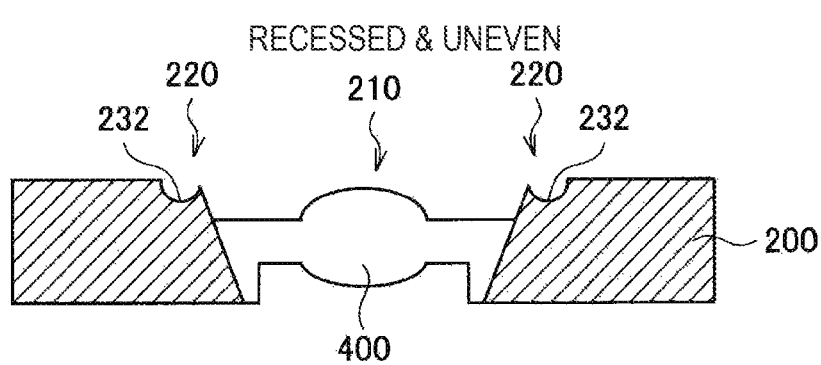
FIG. 6E is a schematic view showing a variation in shape of a recessed part.
Figure 6F:
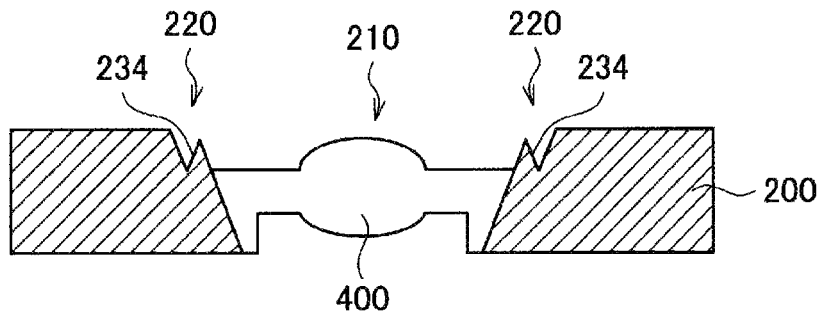
FIG. 6F is a schematic view showing a variation in shape of a recessed part.
Figure 6G:
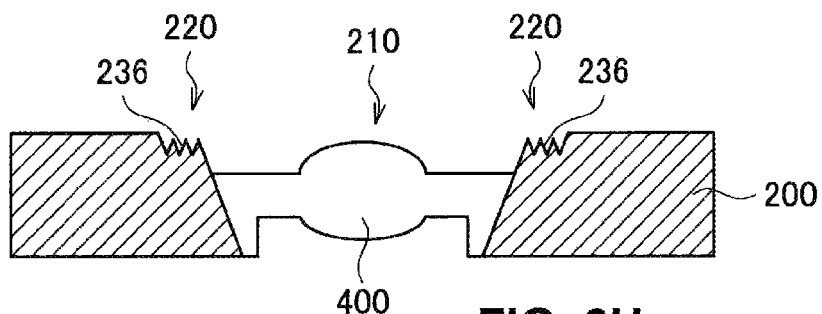
FIG. 6G is a schematic view showing a variation in shape of a recessed part.
Figure 6H:
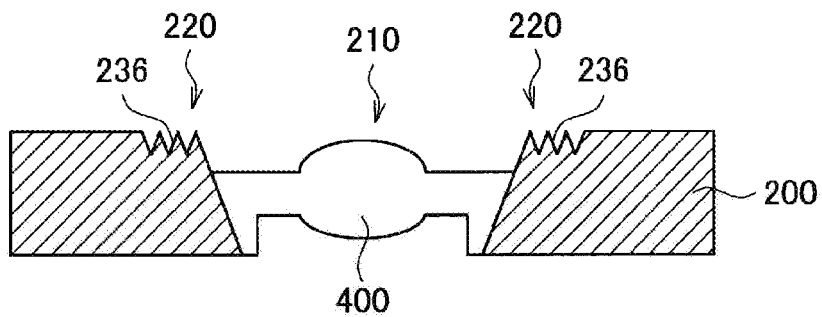
FIG. 6H is a schematic view showing a variation in shape of a recessed part.

FIG. 6E shows an example in which the recessed part 220 includes an uneven curved surface 232. FIG. 6F shows an example in which the recessed part 220 includes an acute-shaped incision 234. FIG. 6G and FIG. 6H each show an example in which the recessed part 220 includes a plurality of acute-shaped incisions 236.

Figure 7A:
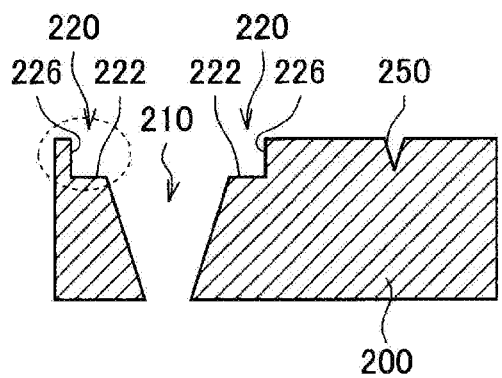
FIG. 7A is a schematic cross-sectional view showing an example in which an alignment mark is provided adjacent to the recessed part.
Figure 7B:
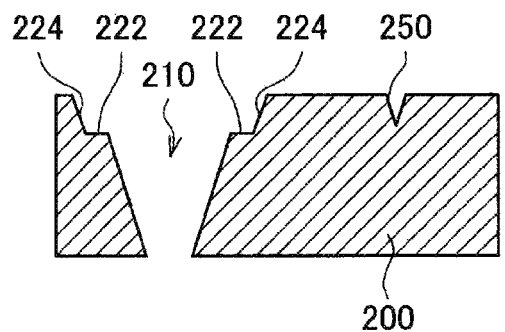
FIG. 7B is a schematic cross-sectional view showing an example in which an alignment mark is provided adjacent to the recessed part.
Figure 7C:
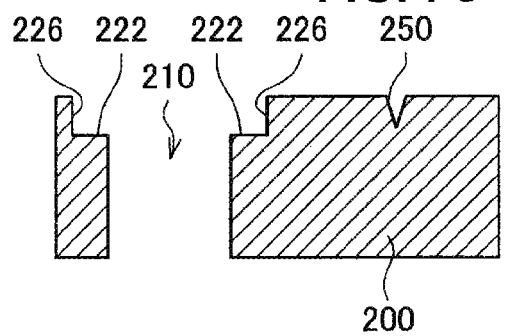
FIG. 7C is a schematic cross-sectional view showing an example in which an alignment mark is provided adjacent to the recessed part.
Figure 7D:
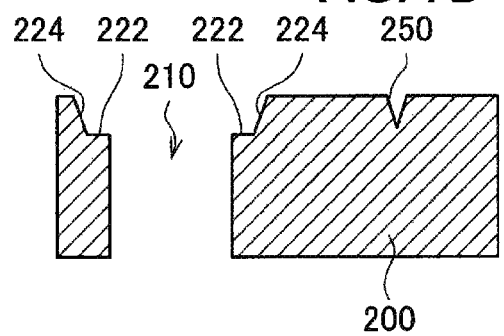
FIG. 7D is a schematic cross-sectional view showing an example in which an alignment mark is provided adjacent to the recessed part.

FIG. 7A to FIG. 7D each are a schematic cross-sectional view showing an example in which an alignment mark 250 is provided adjacent to the recessed part 220. FIG. 7A shows an example in which the alignment mark 250 is provided adjacent to the recessed part 220 as shown in FIG. 6B. In addition, FIG. 7B shows an example in which the alignment mark 250 is provided adjacent to the recessed part 220 as shown in FIG. 6A. FIG. 7C shows an example in which the alignment mark 250 is provided adjacent to the recessed part 220 as shown in FIG. 6B, and an example in which the lateral face 212 of the opening part 210 is formed perpendicularly. In addition, FIG. 7D shows an example in which the alignment mark 250 is provided adjacent to the recessed part 220 as shown in FIG. 6A, and an example in which the lateral face 212 of the opening part 210 is formed perpendicularly.

Figure 7E:
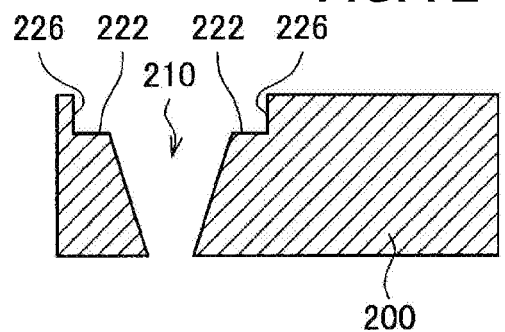
FIG. 7E is a schematic cross-sectional view showing an example in which no alignment mark is provided in a configuration as shown in FIG. 7F.
Figure 7F:
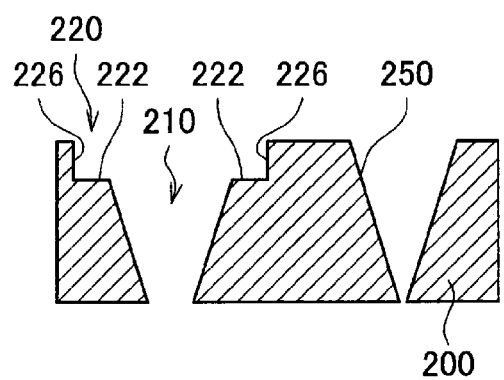
FIG. 7F is a schematic cross-sectional view showing an example in which the alignment mark that penetrates the substrate is provided.

FIG. 7F is a schematic cross-sectional view showing an example in which the alignment mark 250 that penetrates the substrate 200 is provided. FIG. 7E is a schematic cross-sectional view showing an example in which no alignment mark 250 is provided in the configuration as shown in FIG. 7F. The alignment mark 250 can be formed with formation of the recessed part 220, or with formation of the opening part 210.

4. Lamination of Substrate

In a case where a silicon substrate is employed for the substrate 200, by way of example, a thickness of one silicon wafer to be employed for the substrate 200 becomes 725 μm or 775 μm as defined by the standard. In a case where a thickness of the lens 400 is great, so that the thickness of the substrate 200 is insufficient, the plurality of substrates 200 are laminated together so as to form the single lens 400.

Figure 8:
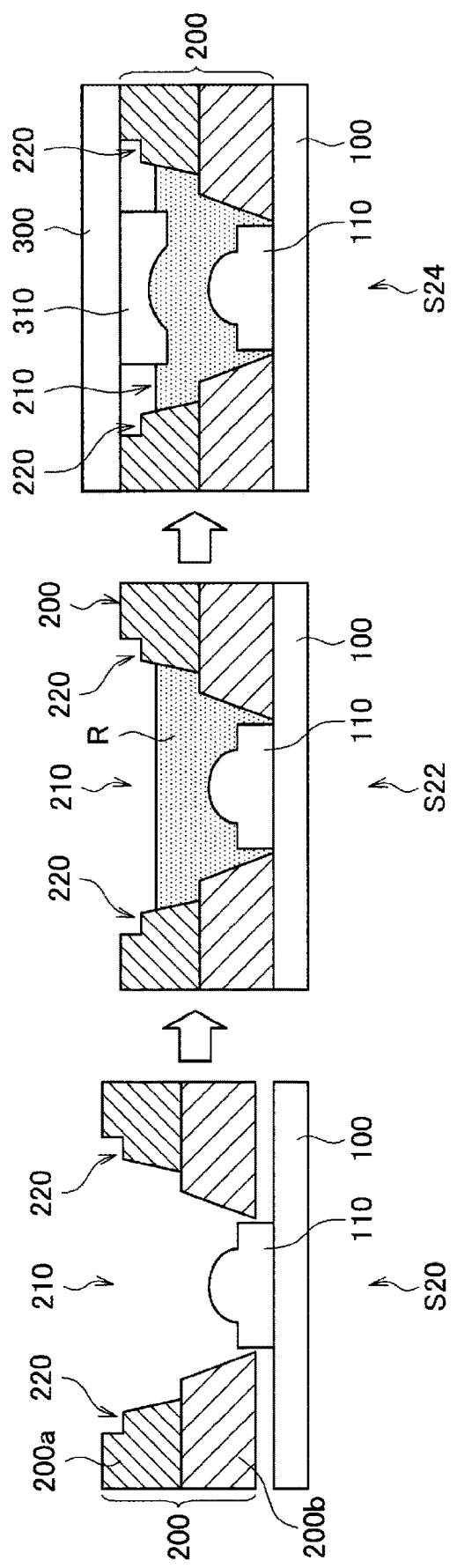
FIG. 8 is a schematic cross-sectional view showing an appearance that molds a lens within an opening part in a single substrate formed by lamination of two substrates.

FIG. 8 is a schematic cross-sectional view showing processes that molds a lens within the opening part 210 of the single substrate 200 formed by lamination of two substrates 200a, 200b. First, at step S20, the substrate 200 is mounted on the lower replica substrate 100, and the lower mold 110 is inserted into the opening part 210. At next step S22, the resin R is filled within the opening part 210. At next step S24, the upper replica substrate 300 is mounted from above on the substrate 200, and the upper mold 310 is pressed against the resin R. Then, the resin R is hardened by irradiation of ultraviolet light to mold the lens 400. After molding, the upper replica substrate 300 and the lower replica substrate 100 are removed from the substrate 200. The recessed part 220 is provided in the substrate 200a in contact with the upper replica substrate 300. In this way, also in the case where the plurality of substrates 200 are laminated together so as to form the single lens 400, the exudation of the resin R can be suppressed by the provision of the recessed part 220.

In addition, as shown in FIG. 8, the opening part 210 of the upper substrate 200 is formed greater than the opening part 210 of the lower substrate 200. In this way, in a case where ultraviolet light is irradiated from above, the ultraviolet light is not blocked, so that the resin R can be surely hardened.

Figure 9A:
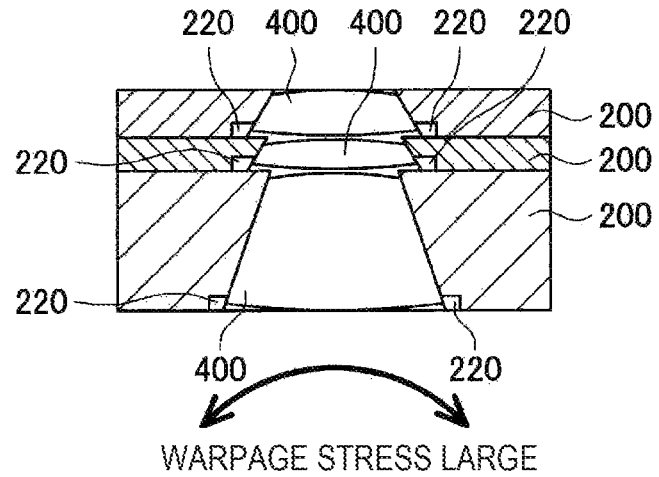
FIG. 9A is a schematic cross-sectional view showing a state in which three substrates are laminated.
Figure 9B:
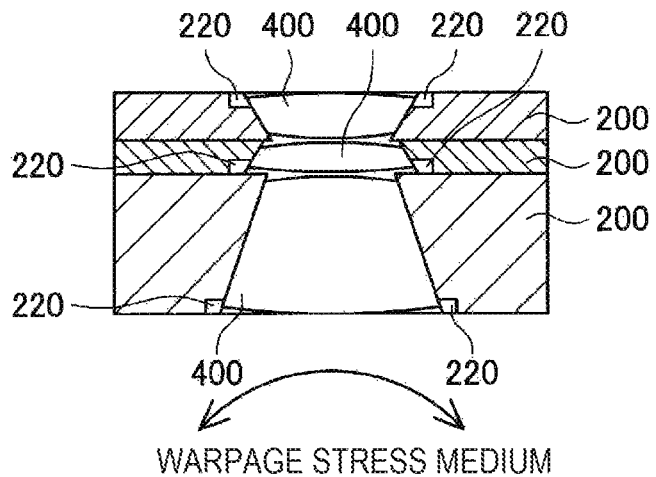
FIG. 9B is a schematic cross-sectional view showing a state in which three substrates are laminated.
Figure 9C:
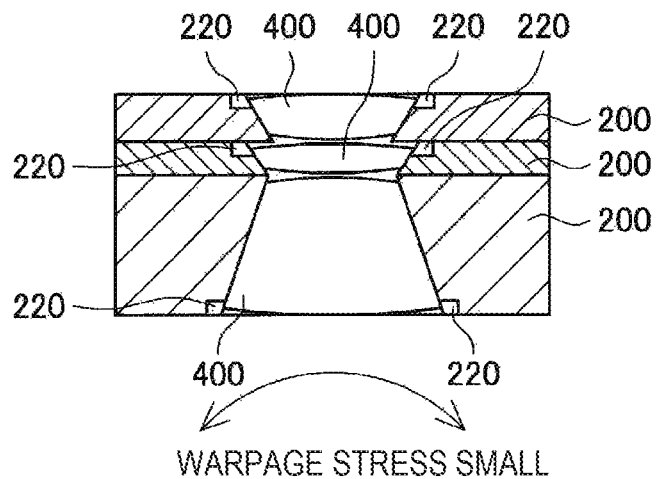
FIG. 9C is a schematic cross-sectional view showing a state in which three substrates are laminated.

FIG. 9A to FIG. 9C each are a schematic cross-sectional view showing a state in which three substrates 200 are laminated. FIG. 9A shows an example in which the tapered surfaces (lateral faces 212) of the opening parts 210 of all the substrates 200 are oriented in the same direction, and the tapered surfaces are faced downward. FIG. 9B shows an example in which the tapered surface of the opening part 210 is faced upward such that the uppermost substrate 200 is inverted with respect to FIG. 9A. FIG. 9C shows an example in which the tapered surface of the opening part 210 is faced upward such that the first and second substrates 200 from above are inverted with respect to FIG. 9A.

Figure 10:
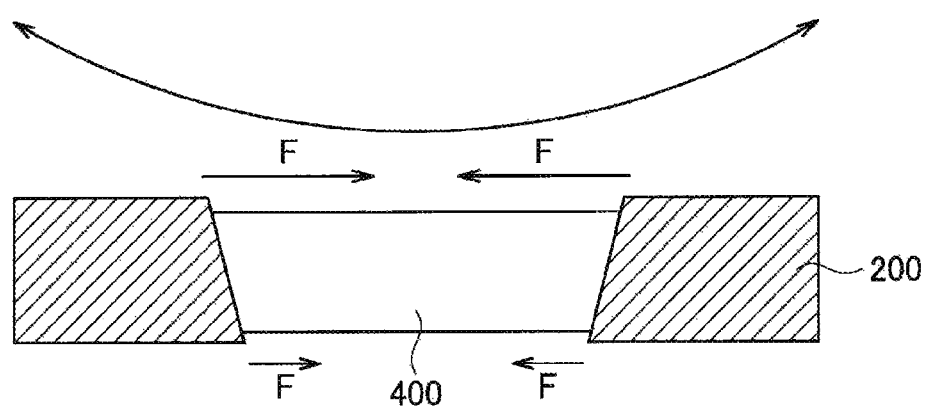
FIG. 10 is a schematic cross-sectional view showing an aspect in which a warpage is generated in a substrate due to a difference in coefficient of thermal expansion.

The substrate 200 and the resin R has a different coefficient of thermal expansion; as the amount of the resin R is greater, a warpage is prone to be generated in the substrate 200 due to a difference in coefficient of thermal expansion between the two. FIG. 10 is a schematic cross-sectional view showing an aspect in which the warpage is generated in the substrate 200 due to the difference in coefficient of thermal expansion. In the example as shown in FIG. 10, the diameter of the lens 400 is larger as it goes upward in the substrate 200, so that the amount of the resin R is increased. For this reason, depending on the difference in coefficient of thermal expansion between the substrate 200 and the resin R, a force F in which the resin R pulls the substrate 200 becomes larger as it goes upward in the substrate 200, whereby the warpage is generated in the substrate 200 so that the upper surface of the substrate 200 comes to a concave surface.

In FIG. 9A, all the tapered surfaces of the opening parts 210 of the substrates 200 face downward; a volume of the lens 400 becomes larger as it goes downward in the individual substrates 200, so that the warpage becomes larger in a direction indicated by arrows. Especially, the lowermost substrate 200 is thicker than the other substrate 200, and the volume of the lens 400 is also larger, so that the warpage also becomes larger.

On the other hand, as shown in FIG. 9B, in a case where the tapered surface of the opening part 210 is faced upward such that the uppermost substrate 200 is inverted, the volume of the lens 40 becomes larger as it goes upward in the uppermost substrate 200 in the uppermost substrate 200, so that the warpage is generated in the uppermost substrate 200 in a direction opposite to that of the second and third substrates 200. For this reason, since the uppermost substrate 200 is inverted, and the tapered surface of the opening part 210 is faced upward, the whole warpage of the laminated substrates 200 can be reduced. In FIG. 9C, since the tapered surface of the opening part 210 is faced upward such that the first and second substrates 200 from above are inverted with respect to FIG. 9A, it becomes possible to reduce further the whole warpage of the laminated substrates 200.

Figure 11:
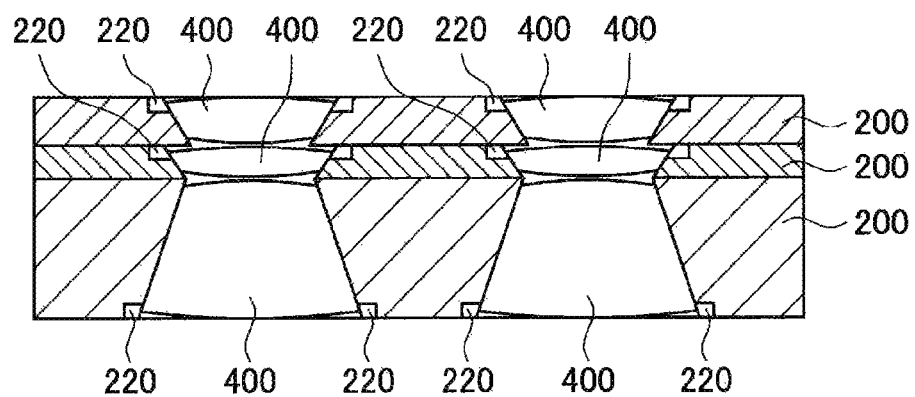
FIG. 11 is a schematic cross-sectional view showing a configuration of a compound eye including two pairs of the lenses having the configuration as shown in FIG. 9C.

FIG. 11 is a schematic cross-sectional view showing a configuration of a compound eye including two pairs of the lenses 400 having the configuration as shown in FIG. 9C. Also in the configuration as shown in FIG. 11, since the tapered surface of the opening part 210 is faced upward such that the first and second substrates 200 from above are inverted, it is possible to reduce the whole warpage of the laminated substrates 200.

5. Method for Manufacturing Substrate Having Recessed Part

Figure 12:
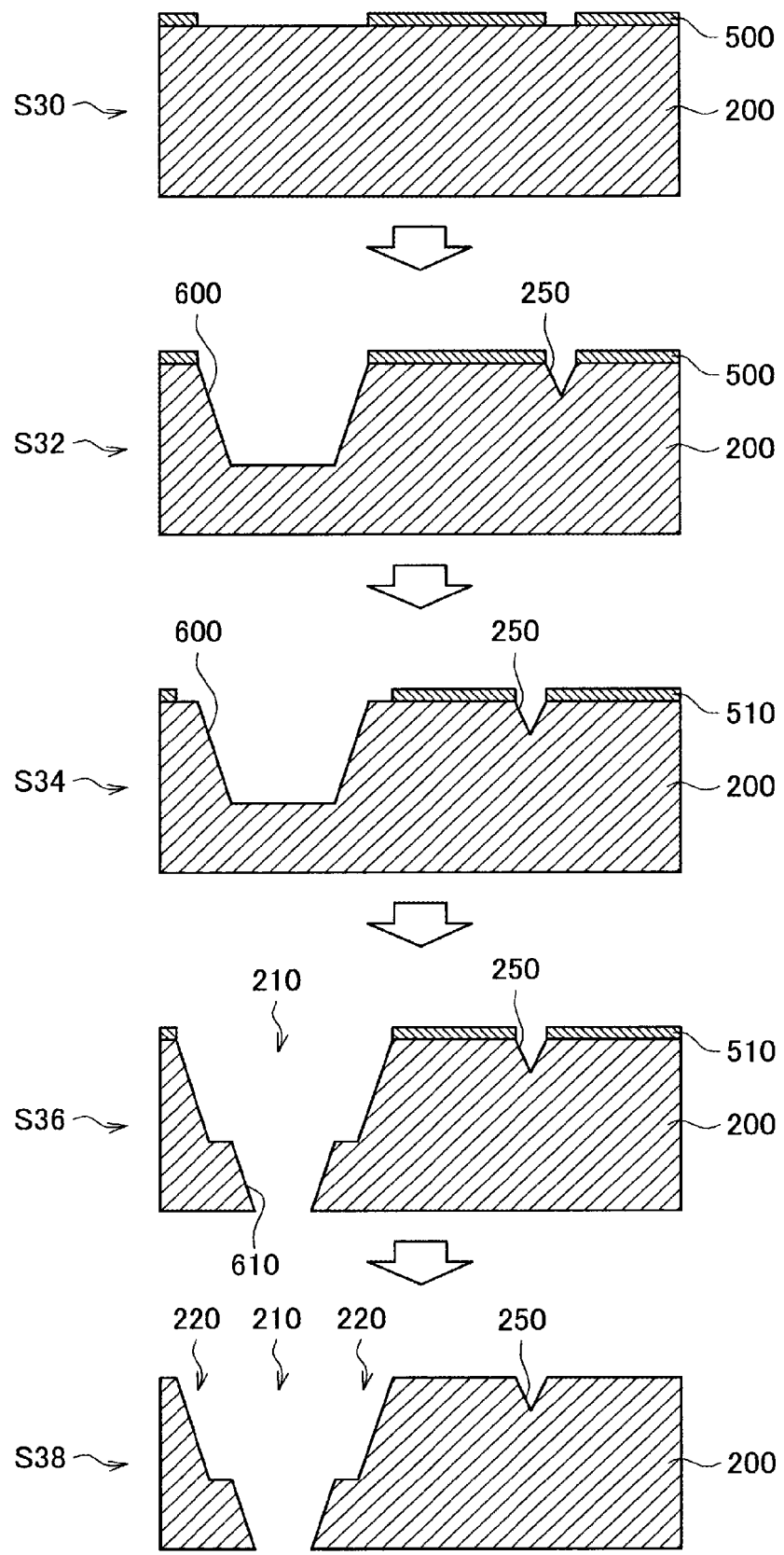
FIG. 12 is a schematic cross-sectional view showing in an order of steps a manufacturing method of a substrate 200.
Figure 13:
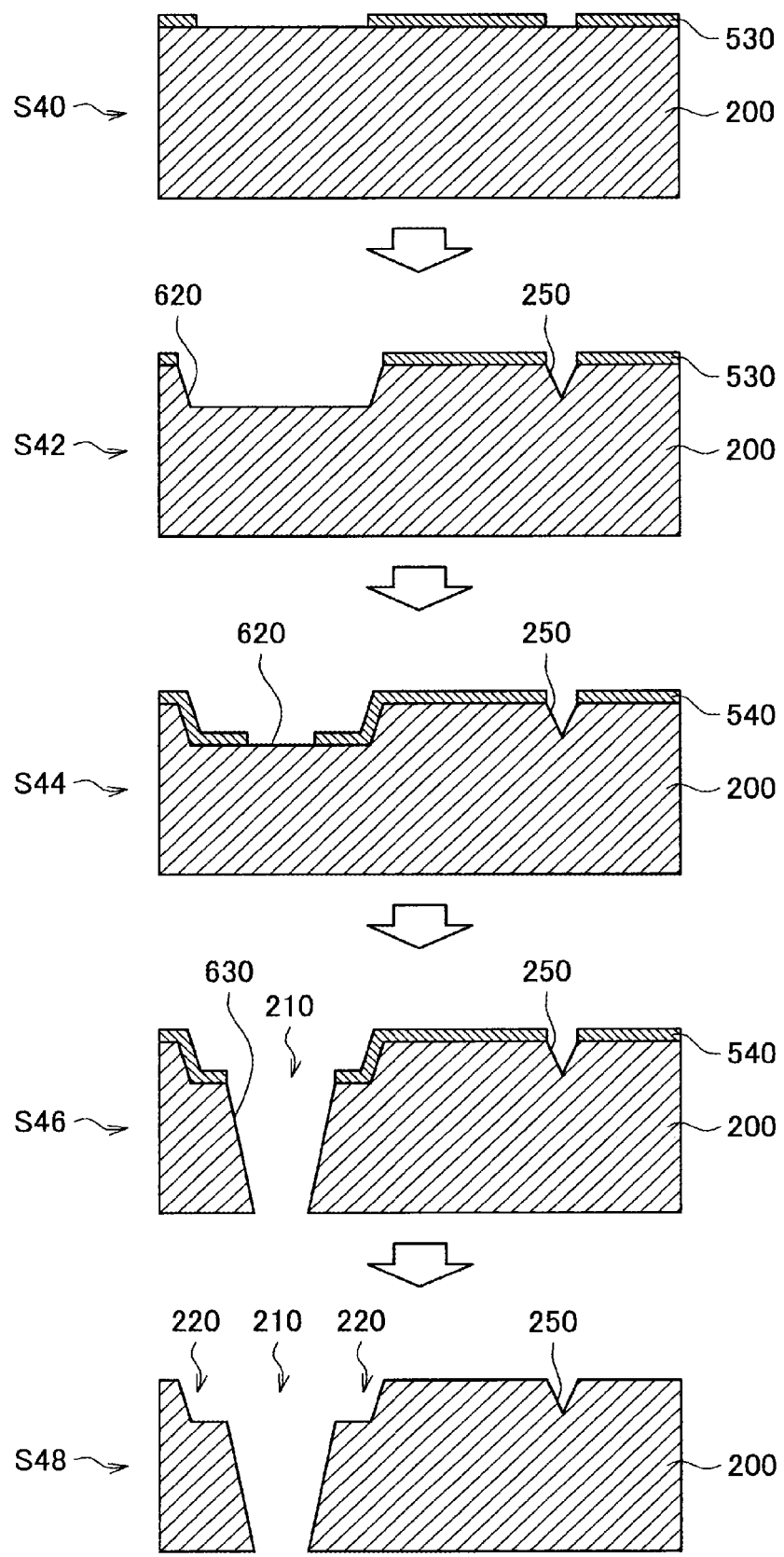
FIG. 13 is a schematic cross-sectional view showing in an order of steps a manufacturing method of the substrate 200.
Figure 14:
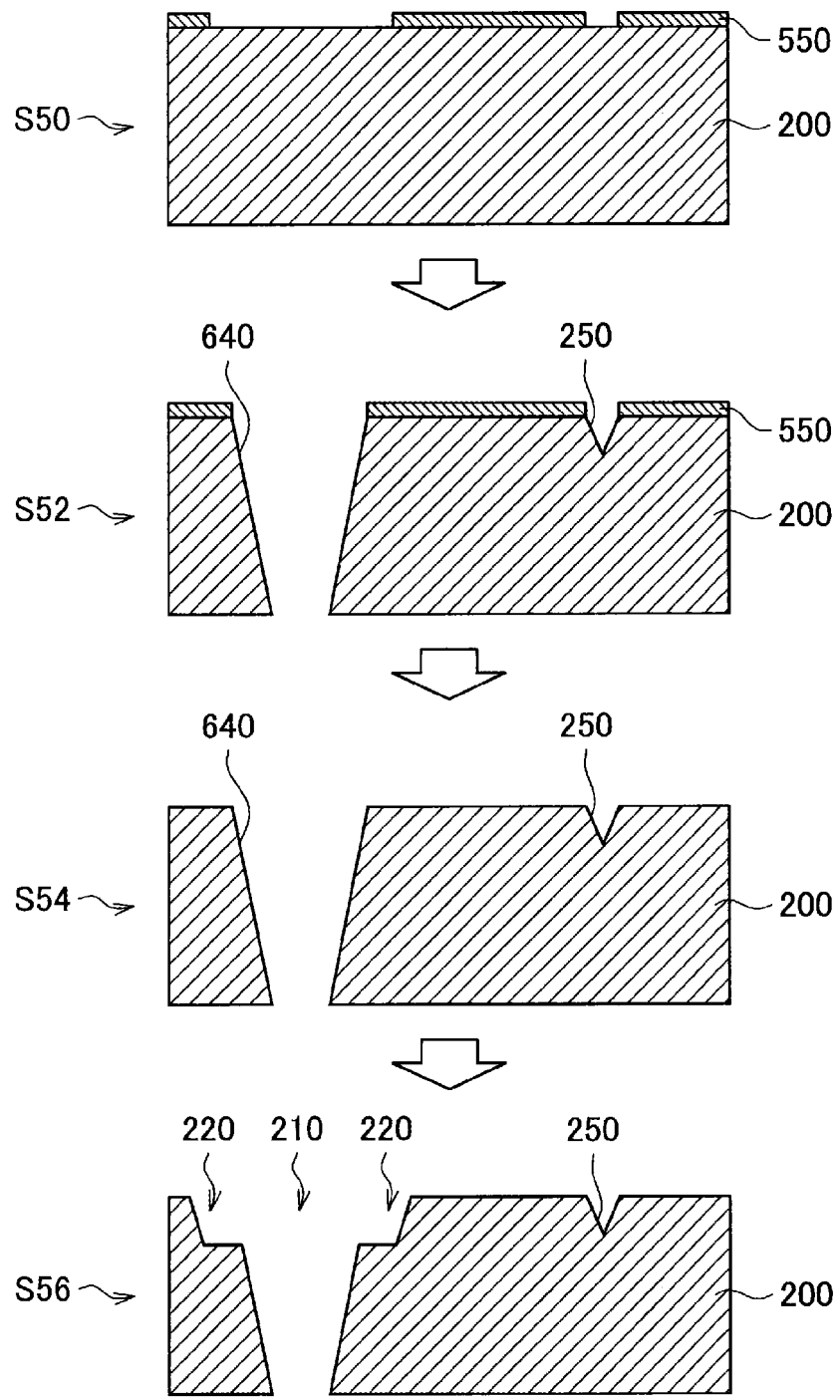
FIG. 14 is a schematic cross-sectional view showing in an order of steps a manufacturing method of the substrate 200.

Next, a method of manufacturing the substrate 200 provided with the recessed part 220 at the edge of the opening part 210 will be described. Here, each of three manufacturing methods as shown in FIGS. 12 to 14 will be described. FIGS. 12 to 14 each are a schematic cross-sectional view showing in an order of steps a manufacturing method of the substrate 200.

The method as shown in FIG. 12 is the method in which the opening part 210 is penetrated at the same time when the recessed part 220 is formed. First, at step S30, a resist 500 is formed on the surface of the substrate 200 prior to processing, and photolithography, subsequent etching and so on are implemented, whereby the resist 500 is patterned. Next, at step S32, the resist 500 is used as a mask, and a region of the substrate 200 that is not covered with the resist 500 is etched by wet etching or dry etching. In this way, a recessed part 600 and the alignment mark 250 are formed on the surface of the substrate 200.

At next step S34, the resist 500 is removed, and a new resist 510 is formed on the surface of the substrate 200 to be patterned. At this time, the resist 510 is patterned so that a region wider than the recessed pan 600 is opened.

At next step S36, the substrate 200 is etched through a mask of the resist 510 by wet etching or dry etching. In this way, a bottom of the recessed part 600 is further etched, an opening 610 that penetrates the substrate 200 is formed, and the opening part 210 is completed. In addition, the recessed part 220 is formed such that the recessed part 600 is enlarged in a horizontal direction. At next step S38, the resist 510 is removed. From the above, the substrate 200 provided with the recessed part 220 at the edge of the opening part 210 can be manufactured.

The method as shown in FIG. 13 is the method in which a recessed part 620 corresponding to the recessed part 220 is formed, and thereafter, the opening part 210 is formed by penetration of the recessed part 620. First, at step S40, a resist 530 is formed on the surface of the substrate 200 prior to processing, and photolithography, subsequent etching and so on are implemented, whereby the resist 530 is patterned. Next, at step S42, a region of the substrate 200 that is not covered with the resist 530 is etched by wet etching or dry etching. In this way, the recessed part 620 and the alignment mark 250 are formed on the surface of the substrate 200.

At next step S44, the resist 530 is removed, and a new resist 540 is formed on the surface of the substrate 200 to be patterned. At this time, the resist 540 is patterned so that an area narrower than a bottom of the recessed part 620 is opened.

At next step S46, the substrate 200 is etched through a mask of the resist 540 by wet etching or dry etching. In this way, the area narrower than the bottom of the recessed part 620 is further etched, and the opening part 210 that penetrates the substrate 200 is formed. The recessed part 220 is formed such that the area narrower than the bottom of the recessed part 620 is further etched. At next step S48, the resist 540 is removed. From the above, the substrate 200 provided with the recessed part 220 at the edge of the opening part 210 can be manufactured.

The method as shown in FIG. 14 is the method in which the opening part 210 is first formed, and thereafter, the recessed part is formed at the edge of the opening part 210. First, at step S50, a resist 550 is formed on the surface of the substrate 200 prior to processing, and photolithography, subsequent etching and so on are implemented, whereby the resist 550 is patterned. Next, at step S52, the resist 550 is used as a mask, and a region of the substrate 200 that is not covered with the resist 550 is etched by wet etching or dry etching so as to be penetrated. In this way, the opening part 210 and the alignment mark 250 are formed on the surface of the substrate 200.

At next step S54, the resist 550 is removed. At next step S56, the recessed part 220 is formed at the edge of the opening part 210. Additionally, a forming method of the recessed part 220 may be the one by etching, or the one by machine processing or the like.

Additionally, although the recessed part 220 is provided in the substrate 200 in the present embodiment, it is also possible to suppress the exudation of the resin R due to the capillary action by provision of the recessed part having a similar function in the upper replica substrate 300.

As described above, according to the present embodiment, in the configuration provided with the lens 400 in the opening part 210 of the substrate 200, the recessed part 220 is formed at the edge of the opening part 210. Thus, it becomes possible to suppress surely protrusion of the resin R to the outside of the opening part 210 when the mold for molding is pressed against the resin R filled in the opening part 210.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A laminated lens structure including:
a plurality of lens structures including
a substrate provided with an opening part,
a lens inserted into the opening part to be fixed to the substrate, and
a recessed part provided at an area in which a lateral face of the opening part and a surface of the substrate are intersected, and recessed more than the surface of the substrate,
in which the lenses are arrayed in an optical axis direction by the substrates being joined.

(2)

The laminated lens structure according to (1), in which the recessed part is provided at an edge of the opening part.

(3)

The laminated lens structure according to (1) or (2), in which the recessed part includes a first face that is parallel to the surface of the substrate, and lower than the surface of the substrate, and a second face that connects the surface of the substrate to the first face.

(4)

The laminated lens structure according to (3), in which the second face is a slope having a predetermined angle to the surface of the substrate.

(5)

The laminated lens structure according to (3), in which the second face is a face perpendicular to the surface of the substrate.

(6)

The laminated lens structure according to (1) or (2), in which the recessed part includes a slope having a predetermined angle to the surface of the substrate.

(7)

The laminated lens structure according to (1) or (2), in which the recessed part is formed in a groove shape on the surface of the substrate.

(8)

The laminated lens structure according to (1) or (2), in which the recessed part includes a curved surface recessed with respect to the surface of the substrate.

(9)

The laminated lens structure according to (1) or (2), in which the recessed part includes an acute incision formed on the surface of the substrate.

(10)

The laminated lens structure according to claim 1, in which an alignment mark that serves as positioning upon lamination of the substrate is formed on the surface of the substrate.

(11)

The laminated lens structure according to any one of (1) to (9),
in which the substrate corresponding to one lens is configured by lamination of a plurality of unit substrates, and
the opening part that is formed in the unit substrate located on one surface side of the substrate is larger than the unit substrate located on the other surface side of the substrate.

(12)

The laminated lens structure according to any one of (1) to (10),
in which the lateral face of the opening part of the substrate is formed as a tapered surface,
a part of the plurality of substrates are arranged so that the tapered surface faces one side of the substrate, and
the rest of the plurality of substrates are arranged so that the tapered surface faces the other side of the substrate.

(13)

A camera module including:
a laminated lens structure including
a plurality of lens structures including a substrate provided with an opening part, a lens inserted into the opening part to be fixed to the substrate, and a recessed part provided at an area in which a lateral face of the opening part and a surface of the substrate are intersected, and recessed more than the surface of the substrate, in which the lenses are arrayed in an optical axis direction by the substrates being joined; and
an imaging element having an imaging surface on which an object image is formed by the lens of the laminated lens structure.

(14)

A method of manufacturing a laminated lens structure, including:
a step of sealing an opening part by inserting a first mold from a side, not provided with a recessed part, into the opening part of a substrate having the opening part, in which the substrate is provided with the recessed part that is recessed more than a surface of the substrate at an area in which a lateral face of the opening part and the surface of the substrate are intersected:
a step of filling a resin in the opening part;
a step of pressing a second mold against the resin by inserting the second mold from a side provided with the recessed part into the opening part; and
a step of hardening the resin.

REFERENCE SIGNS LIST

100 lower replica substrate
110 lower mold
200 substrate
210 opening part
212 lateral face
220 recessed part
222 upper surface
224, 226 lateral face
228 tapered surface
230 groove
232 curved surface 234, 236 incision
250 alignment mark
300 upper replica substrate
310 upper mold
400 lens
700 imaging element
800 laminated lens structure
900 camera module

What is claimed is:

1. A laminated lens structure, comprising:
a plurality of lens structures, each lens structure including:
  a substrate provided with an opening part,
  a lens inserted into the opening part to be fixed to the substrate, and
  a recessed part provided at an area in which a lateral face of the opening part and a surface of the substrate are intersected, and recessed more than the surface of the substrate,
wherein the lenses are arrayed in an optical axis direction by each of the substrates of the plurality of lens structures being joined,
wherein the lateral face of the opening part of the substrate is formed as a tapered surface,
wherein at least one of the substrates of the plurality of lens structures is arranged so that the tapered surface faces downward, and
wherein a remainder of the substrates of the plurality of lens structures are arranged so that the tapered surface faces upward.

2. The laminated lens structure according to claim 1, wherein the recessed part is provided at an edge of the opening part.

3. The laminated lens structure according to claim 1, wherein the recessed part includes a first face that is parallel to the surface of the substrate, and lower than the surface of the substrate, and a second face that connects the surface of the substrate to the first face.

4. The laminated lens structure according to claim 3, wherein the second face is a slope having a predetermined angle to the surface of the substrate.

5. The laminated lens structure according to claim 3, wherein the second face is a face perpendicular to the surface of the substrate.

6. The laminated lens structure according to claim 1, wherein the recessed part includes a slope having a predetermined angle to the surface of the substrate.

7. The laminated lens structure according to claim 1, wherein the recessed part is formed in a groove shape on the surface of the substrate.

8. The laminated lens structure according to claim 1, wherein the recessed part includes a curved surface recessed with respect to the surface of the substrate.

9. The laminated lens structure according to claim 1, wherein the recessed part includes an acute incision formed on the surface of the substrate.

10. The laminated lens structure according to claim 1, wherein an alignment mark that serves as positioning upon lamination of the substrate is formed on the surface of the substrate.

11. The laminated lens structure according to claim 1,
wherein the substrate corresponding to one lens is configured by lamination of a plurality of unit substrates, and
the opening part that is formed in the unit substrate located on one surface side of the substrate is larger than the unit substrate located on the other surface side of the substrate.

12. A camera module, comprising:
a laminated lens structure including:
  a plurality of lens structures, each lens structure including:
    a substrate provided with an opening part,
    a lens inserted into the opening part to be fixed to the substrate, and
    a recessed part provided at an area in which a lateral face of the opening part and a surface of the substrate are intersected, and recessed more than the surface of the substrate,
  wherein the lenses are arrayed in an optical axis direction by each of the substrates of the plurality of lens structures being joined,
  wherein the lateral face of the opening part of the substrate is formed as a tapered surface,
  wherein at least one of the substrates of the plurality of lens structures is arranged so that the tapered surface faces downward, and
  wherein a remainder of the substrates of the plurality of lens structures are arranged so that the tapered surface faces upward; and
an imaging element having an imaging surface on which an object image is formed by the lens of the laminated lens structure.

13. A method of manufacturing a laminated lens structure, having a plurality of lens structures with each lens structure including a substrate, comprising:
a step of sealing an opening part by inserting a first mold from a side, not provided with a recessed part, into the opening part of the substrate of the plurality of lens structures having the opening part, wherein the substrate is provided with the recessed part that is recessed more than a surface of the substrate at an area in which a lateral face of the opening part and the surface of the substrate are intersected;
a step of filling a resin in the opening part;
a step of pressing a second mold against the resin by inserting the second mold from a side provided with the recessed part into the opening part;
a step of hardening the resin,
wherein the lateral face of the opening part of the substrate is formed as a tapered surface, and
a step of joining each of the substrates of the plurality of lens structures in a vertical direction,
wherein at least one of the substrates of the plurality of lens structures is arranged so that the tapered surface faces downward, and
wherein a remainder of the substrates of the plurality of lens structures are arranged so that the tapered surface faces upward.

14. The camera module according to claim 12, wherein the recessed part is provided at an edge of the opening part.

15. The camera module according to claim 12, wherein the recessed part includes a first face that is parallel to the surface of the substrate, and lower than the surface of the substrate, and a second face that connects the surface of the substrate to the first face.

16. The camera module according to claim 15, wherein the second face is a slope having a predetermined angle to the surface of the substrate.

17. The camera module according to claim 15, wherein the second face is a face perpendicular to the surface of the substrate.

18. The camera module according to claim 12, wherein the recessed part includes a slope having a predetermined angle to the surface of the substrate.

19. The camera module according to claim 12, wherein the recessed part is formed in a groove shape on the surface of the substrate.

20. The camera module according to claim 12, wherein the recessed part includes a curved surface recessed with respect to the surface of the substrate.

* * * * *